TONE ALERTING CIRCUIT

Filed Jan. 8, 1957

INVENTOR.
MELVILLE C. CREUSERE

BY [signature]

ATTORNEYS 2,999,234

TONE ALERTING CIRCUIT

Melville C. Creusere, China Lake, Calif., assignor to the United States of America as represented by the Secretary of the Navy Filed Jan. 8, 1957, Ser. No. 633,168
4 Claims. (Cl. 343—7)
(Granted under Title 35, U.S. Code (1952), sec. 266)

Figures 1, 2:
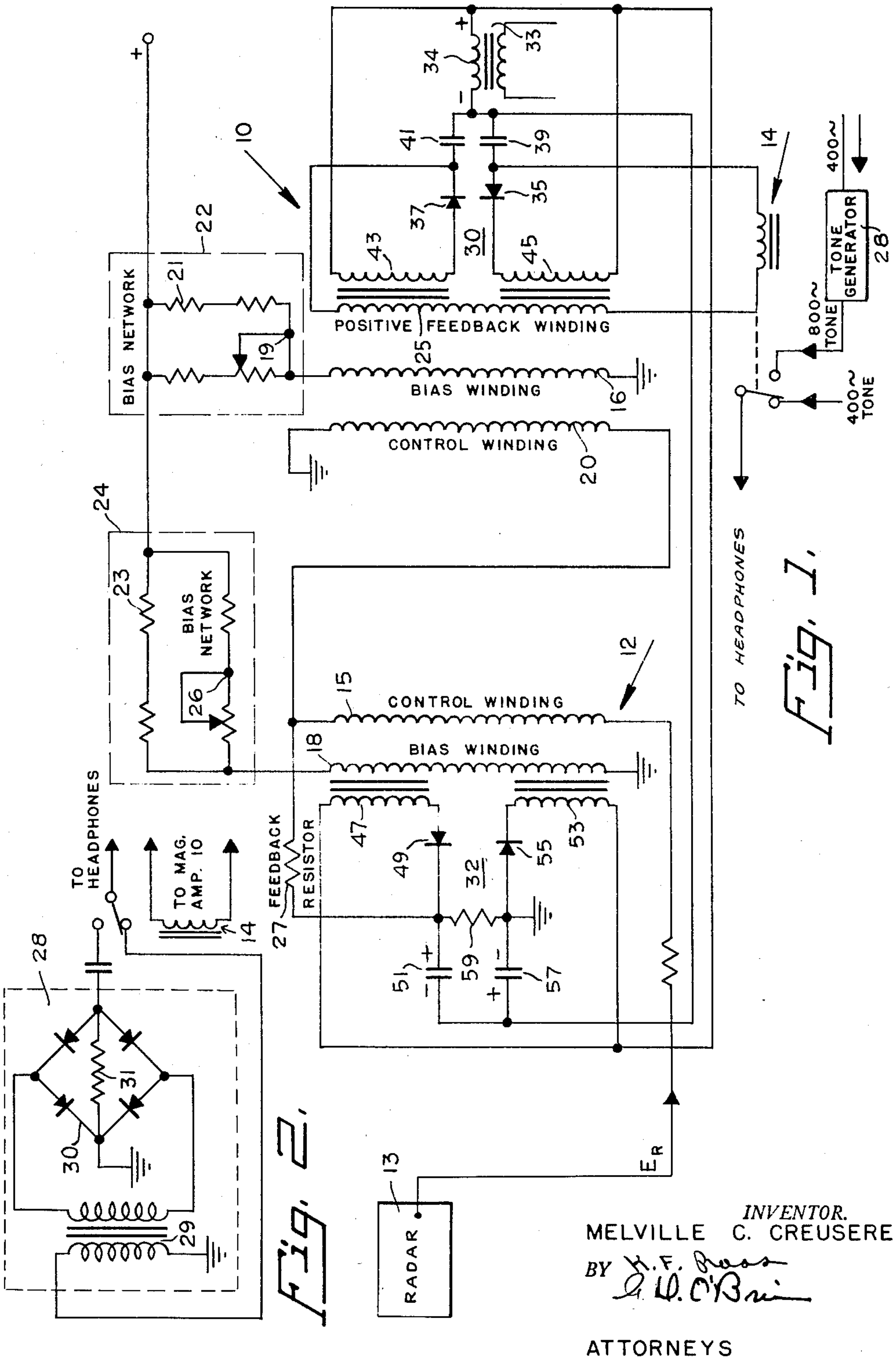

The invention described herein may be manufactured and used by or for the Government of the United States of America for governmental purposes without the payment of any royalties thereon or therefor.

The present invention relates to an object proximity warning system and employs a pair of magnetic amplifiers individually responsive to discrete voltage magnitudes, which are representative of the proximity of the object, to produce one of two audible tones, depending upon the proximity of the object. More particularly, the present invention provides a pair of magnetic amplifiers interconnected to function as a one-shot flip-flop circuit, i.e., one magnetic amplifier being operatively effective under one condition of proximity and the other magnetic amplifier being operatively effective under a second condition of proximity to disable the first magnetic amplifier.

The present invention accepts a D.C. voltage which is a function of range from a range-only radar, and controls an aural tone as a function of the range voltage. Radar systems of this type are conventional and the operation thereof is described in the M.I.T. Radiation Laboratory Series, Electronic Time Measurements, vol. 20, pages 308 to 325, 1949, McGraw-Hill Book Company, Inc. For example, at long ranges a 400 cycle tone is produced and as the radar range decreases to some predetermined value the 400 cycle tone changes to an 800 cycle tone; after a further voltage decrease to another predetermined value the tone changes back to a 400 cycle tone. Previous methods were first, to use cams on the shaft of a servo motor driven as a function of range voltage to actuate microswitches which in turn controlled the switching of tones, and second, to use vacuum tubes in combination with several plate relays. In the second method the vacuum tubes isolate the relays from the range voltage circuit and provide sufficient gain to mask the effect of variations in relay characteristics on the accuracy of the operating switching point of the relays. The disadvantage of the first of the above old methods is that it involved mechanical parts and components not directly associated with tone alerting. The second method using vacuum tubes and several relays has greater limitations on reliability and, in addition, is larger than desirable for an airborne alerting unit. The advantages of the present invention over that done before is in the use of magnetic amplifiers permitting the complete elimination of vacuum tube amplifiers, and eliminating any necessity for sensitive relays; advantage is also taken of the D.C. stability of magnetic amplifiers, and a circuit is obtained which is within accuracy limitations for a wide range of ambient temperatures.

An object of the invention, therefore, is to provide a device for indicating to the pilot of an attacking fighter plane when he is within firing range of a target, and when he should break off his attack to avoid colliding with the target.

Another object of the invention is to provide an object of proximity warning system.

A further object of the invention is to provide a compact reliable tone alerting system utilizing magnetic amplifiers in a circuit to cause a relay to be in its one state at two separated voltages, and its other state at a voltage intermediate the two separated voltages.

Other objects and many of the attendant advantages of this invention will be readily appreciated as the same become better understood by reference to the following detailed description when considered in connection with the accompanying drawings wherein:

FIG. 1 is a schematic diagram of a tone alerting circuit utilizing magnetic amplifiers; and FIG. 2 is a schematic diagram of a tone generating circuit.

Referring now to the drawings, the operation of the tone alerting circuit of the present invention may be explained with reference to FIG. 1. Both of the magnetic amplifiers 10 and 12 shown are of the self-saturating type, referred to as amplistats by H. F. Storm, "Magnetic Amplifiers," by H. F. Storm, 1955, John Wiley & Sons. With only a single control winding, each amplifier would have a relation between its control winding current and its output current similar to that shown by Storm on page 257 of his book. It may be noted that as the control current is increased from a negative value: (1) it at first results in no increase in output current, (2) then there is a roughly proportional increase in output current with a change in control current, and (3) finally the output current reaches a maximum value and will increase no further with a change in control current. The first state may be referred to as the cutoff state, the second state may be referred to as the proportional control state, and the third state may be referred to as the saturated state of the amplifier. By the use of positive feedback, the proportional region of operation of the magnetic amplifier 10 may be made to occupy only a small portion of the control current range, essentially resulting in switch action with respect to variation of input current through this range. Further, an additional control winding, called a bias winding, may be added to the amplifier such that the switch action may be made to occur at any desired value of primary control winding current dependent on the polarity and magnitude of the current passed through said bias winding. These devices are made use of in the tone alerting circuit.

The circuit operation may then be described as follows: The range voltage $E_T$ from a range-only radar 13 is applied to the circuit, and at long ranges (large values of voltage) causes the same current to flow through control windings 15 and 20 of magnetic amplifiers 12 and 10, respectively since both amplifiers have been adjusted by the currents in their bias windings 16 and 18 to remain cutoff at such large input currents. When the input voltage $E_T$ has been reduced to a value determined by the current (adjusted by the potentiometer 19 in bias network 22) through the bias winding 16 of magnetic amplifier 10, this amplifier switches (by virtue of the necessary number of turns on its positive feedback winding 25) to its saturated output, thus energizing the relay 14, and switching the tone to 800 cycles. Magnetic amplifier 12 is not affected by this action and remains in the cutoff condition. As the range further decreases (and the range voltage $E_T$ decreases accordingly), the magnetic amplifier 12 is caused to operate at a value of range dependent on the adjustment of the current through its bias winding 18 (effected by adjustment of the potentiometer 26 in bias network 24). When this amplifier 12 switches (in this amplifier there is no positive feedback winding and the positive feedback is provided instead by the voltage dividing action of the feedback resistor 27 in combination with the resistance of control winding 20 of amplifier 10), it causes a current to flow through the feedback resistor 27 into the control winding 20 of amplifier 10. This current overrides the tendency of the bias winding current in bias winding 16 to cause the amplifier 10 to remain on, thus switching it off and deenergizing the relay 14 and causing the tone to revert back to 400 cycles, the original frequency, and the operating cycle of the tone alerting circuit is complete.

The specific control current at which the characteristic of a magnetic amplifier changes from cutoff condition to proportional output and thence to saturated output condition is affected by the ambient temperature of the components. An additional function of the bias winding is to incorporate temperature sensitive resistors which cause a compensating change in bias current. These are resistors 21 and 23 used in bias networks 22 and 24 of amplifiers 10 and 12 respectively.

Gate circuits 30 and 32 are employed in magnetic amplifiers 10 and 12, respectively, to provide D.C. power output. A.C. voltage is supplied to gate circuits 30 and 32 by means of transformer 33. Gate circuit 30 includes diode 37, capacitor 41, secondary 34 of transformer 33 and gate winding 43 connected in a series loop and diode 35, capacitor 39, secondary 34 and gate winding 45 connected in another series loop. The D.C. output of gate circuit 30 is connected in series with relay 14 and positive feedback winding 25 of magnetic amplifier 10. Gate circuit 32 includes gate winding 47, diode 49, capacitor 51 and secondary 34 connected in a series loop and gate winding 53, diode 55, capacitor 57 and secondary 34 are connected in another series loop. The D.C. output of gate circuit 32 is connected in series with resistor 59, feedback resistor 27 and control winding 20 of magnetic amplifier 10.

The operation of gate circuits 30 and 32 are identical and, therefore, the operation of only gate circuit 32 is hereinafter described. Gate circuit 32 is the same as the gate circuit described and shown on pages 253 and 254 of the aforementioned Storm publication, except that two of the rectifiers have been replaced by capacitors. The advantage of this is to incorporate a certain amount of filtering and to eliminate two rectifiers. The size of each capacitor is sufficiently large so that most of its charge is stored over the period of a full cycle of the A.C. power frequency supplied by transformer 33. For purposes of analysis, each capacitor may be considered as a battery having polarities as shown during all periods of operation. Assume secondary 34 has the polarity shown during the first half cycle. During this half cycle, the anode of diode 49 will be subjected to the positive potential indicated. However, the positive potential of capacitor 51 is applied to the cathode of diode 49 and the diode will remain reverse biased until the positive potential applied to the anode exceeds the positive potential applied to the cathode. When the anode potential exceeds the cathode potential, current will start to flow at which time flux starts to build up in gate winding 47 according to $E=Nd\phi/dt$. During the flux build up, the inductance of the gate winding is large compared to the gate winding resistance and diode resistance so that only a small amount of current will flow. Eventually, the gate winding core will saturate and become essentially zero impedance to the flow of current so that the series resistance in the loop comprising gate winding 47, diode 49, capacitor 51 and secondary 34 become the only limit to current flow. From this point on, capacitor 51 charges until the secondary voltage drops below the voltage on capacitor 51 at which point the current flow for the first half cycle of supply voltage is complete. During this half cycle, diode 55 will not conduct since the potential of the cathode thereof always exceeds the potential of the anode. During the next half cycle of A.C. supply voltage, the signs on secondary 34 would be reversed and the same sequence of operation would be repeated only diode 49 would not conduct and diode 55 would conduct in the same manner as did diode 49 during the first half cycle of operation.

By passing current through a control winding, the cores of the gate windings may have their initial flux level preset so that the time between the start of conduction and saturation of the cores may be controlled. The time of saturation determines the firing angle of the diodes, which in turn determines the voltage to which the capacitors will be charged which determines the current of flow through resistor 59. The current output through resistor 59 is approximately a linear function of the voltage applied to the control winding.

It should be noted that prior to the point where magnetic amplifier 12 turns on, there will be only a negligible feedback current through control winding 20 since the magnitude of the A.C. supply voltage is not sufficient to saturate gate windings 47 and 53 for the period of time necessary to cause the feedback current in control winding 20 to turn off magnetic amplifier 10. However, when the radar output signal decreases sufficiently, gate windings 47 and 53 will become saturated and a large amount of current will flow through diodes 49 and 55. This results in highly charging capacitors 51 and 57, as shown, thereby causing a large voltage drop across resistor 59 and large current flow through control winding 20. This current flow through control winding 20 turns off magnetic amplifier 10 which in turn prevents current flow through relay 14 thus causing return to the 400 cycle tone.

In the tone generating circuit 28 of FIG. 1, as shown in FIG. 2, by way of example, an 800 cycle signal is obtained from a 400 cycle voltage. The circuit of FIG. 2 is essentially a bridge rectifier circuit, but use is made of the A.C. component instead of the D.C. component of the rectifier circuit. Transformer 29 is used for D.C. isolation of the 400 cycle signal applied thereto. As is well known, a single phase full-wave bridge rectifier produces a ripple frequency of twice the frequency of the power supply and of a peak value equal to two-thirds of the D.C. component of the output. The device of FIG. 2 uses the second harmonic ripple frequency of the output of bridge 30 across load resistor 31 for the 800 cycle tone, rather than the D.C. component. The full harmonic content of the output of the bridge is retained and the tone thus obtained is somewhat harsher than a pure 800 cycle note.

Obviously, many modifications and variations of the present invention are possible in the light of the above teachings. It is therefore to be understood that within the scope of the appended claims the invention may be practiced otherwise than as specifically described.

What is claimed is:

1. An object proximity warning system comprising a tone generating supply means, a radar means, and a relay means for changing the tone supplied by said tone-generating means, said relay means including a first magnetic amplifier and a second, low-level, magnetic amplifier, said first magnetic amplifier being supplied with positive feedback so that a very small change in control current is sufficient to cause said first amplifier output to vary from a very small output to its maximum output which is sufficient to energize said relay and thus operate as a switch at a predetermined control current, said control current being derived from the radar range voltage of said radar means at a first desired range, said low-level magnetic amplifier being connected to operate as a switch in a similar manner as said first magnetic amplifier whereby when a second desired radar range is reached the current output of said low-level amplifier changes from very low to full output which is added to the much smaller current from the radar range voltage and to the control winding of said first magnetic amplifier to cause it to return to its cut-off condition and deenergize said relay.

2. A dual-coincidence circuit comprising first and second magnetic amplifiers and a relay, said relay indicating the coincidence of a variable input voltage with a higher specified voltage when energized and indicating subsequent coincidence of said input voltage to a lower specified voltage when deenergized, said first magnetic amplifier being supplied with positive feedback so that a very small change in its control current will cause the output of the second magnetic amplifier to vary from a very small output to maximum output which is sufficient to energize said relay, said second magnetic amplifier operating in a similar manner as said first magnetic amplifier and having its output connected to the control winding of said first amplifier to cause it to return to its cut-off condition and deenergize said relay when the current output of said second magnetic amplifier changes from very low to full output.

3. An object proximity warning system comprising a tone generating means, radar means having a voltage output the magnitude of which varies inversely with the proximity of the target, a first magnetic amplifier responsive to said radar voltage and providing maximum power output when said radar voltage is at a first magnitude, a second magnetic amplifier responsive to said radar voltage and providing maximum power output when said radar voltage is at a second predetermined magnitude less than said first predetermined magnitude, the power output of said first magnetic amplifier being applied to said tone generating means, the power output of said second magnetic amplifier being applied to said first magnetic amplifier whereby when said radar voltage is at said first magnitude said tone generating produces one tone and when said radar voltage is at said second magnitude the power output of said second magnetic amplifier applied to said first magnetic amplifier causes reduction of the power output of said first magnetic amplifier and said tone generating means produces a different tone.

4. An object proximity warning system comprising a tone generating means operatively connected to a relay wherein one tone is produced when current flows through said relay and another tone is produced when no current flows through said relay, a first magnetic amplifier including gate windings, a bias winding and a control winding, said gate windings being connected in series with said relay, a potential source supplying a predetermined magnitude of current to said bias winding in a direction for saturating said first magnetic amplifier, a second magnetic amplifier including gate windings, a bias winding and a control winding, said last mentioned gate windings being operatively connected with said first mentioned control winding, a potential source supplying a predetermined magnitude of current to said last mentioned bias winding in a direction for saturating said second magnetic amplifier, said last mentioned predetermined magnitude of current being less than said first mentioned predetermined magnitude of current, radar means having a voltage output the magnitude of which varies inversely with the proximity of a target, said radar voltage output being connected in series with the control windings of both of said magnetic amplifiers such that the direction of the current flow in both control windings tends to cause desaturation of said magnetic amplifiers, whereby upon decreasing radar voltage output the current flow in said first mentioned control winding decreases to a value where said first mentioned bias winding causes said first magnetic amplifier to become saturated thereby permitting large current flow through said first mentioned gate windings and said relay and upon further decrease of said radar voltage output the current flow in said second mentioned control winding decreases to a value where said second mentioned bias winding causes said second magnetic amplifier to become saturated thereby permitting large current flow from said second mentioned gate windings to said first mentioned control winding thereby preventing current flow through said first mentioned gate windings and said relay.

References Cited in the file of this patent

UNITED STATES PATENTS

| | | |
|---|---|---|
| 2,403,527 | Hershberger | July 9, 1946 |
| 2,519,513 | Thompson | Aug. 22, 1950 |
| 2,594,022 | Horton | Apr. 22, 1952 |
| 2,790,969 | Blitz | Apr. 30, 1957 |